(12) United States Patent
Tominaga et al.

(10) Patent No.: US 6,920,007 B2
(45) Date of Patent: Jul. 19, 2005

(54) LOAD/UNLOAD METHOD AND A MAGNETIC DISK DRIVE USING THE METHOD

(75) Inventors: Hidefumi Tominaga, Odawara (JP); Tsuyoshi Arai, Odawara (JP); Takao Horiguchi, Odawara (JP); Toshiyuki Kikuta, Hiratsuka (JP); Yoshikatsu Fujii, Atsugi (JP)

(73) Assignee: Hitachi Global Storage Technologies Japan, Ltd., Kanagawa-Ken (JP)

( * ) Notice: Subject to any disclaimer, the term of this patent is extended or adjusted under 35 U.S.C. 154(b) by 419 days.

(21) Appl. No.: 10/067,401

(22) Filed: Feb. 7, 2002

(65) Prior Publication Data

US 2003/0081343 A1 May 1, 2003

(30) Foreign Application Priority Data

Nov. 1, 2001 (JP) ..................................... 2001-335967

(51) Int. Cl.[7] ............................................. G11B 21/02
(52) U.S. Cl. ........................................................ 360/75
(58) Field of Search ................................ 360/75, 53, 48

(56) References Cited

U.S. PATENT DOCUMENTS

| | | | |
|---|---|---|---|
| 5,315,455 A | | 5/1994 | Ito |
| 5,455,723 A | * | 10/1995 | Boutaghou et al. ............ 360/75 |
| 5,633,767 A | * | 5/1997 | Boutaghou et al. ............ 360/53 |
| 5,949,608 A | | 9/1999 | Hunter |
| 6,054,833 A | | 4/2000 | Takeuchi |
| 6,212,027 B1 | | 4/2001 | Lee et al. |
| 6,320,717 B1 | * | 11/2001 | Feng ............................. 360/75 |
| 6,504,663 B2 | * | 1/2003 | Hirano et al. ................. 360/48 |
| 6,563,660 B1 | | 5/2003 | Hirano et al. |
| 6,590,731 B1 | * | 7/2003 | Pan et al. ...................... 360/75 |

FOREIGN PATENT DOCUMENTS

| | | |
|---|---|---|
| EP | 1 014 343 | 6/2000 |
| JP | 11-96708 | 4/1999 |
| JP | 2001-43645 | 2/2001 |
| JP | 2001-283545 | 10/2001 |

* cited by examiner

*Primary Examiner*—Sinh Tran
*Assistant Examiner*—K. Wong
(74) *Attorney, Agent, or Firm*—Mattingly, Stanger, Malur & Brundidge, P.C.

(57) ABSTRACT

To control load/unload operation of a slider with magnetic head mounted thereon, by which the speed can always be controlled stably while avoiding the slowdown or temporary stop of an actuator during load/unload operation, a magnetic disk drive is configured using magnetic disk media with the servo information written therein beforehand up to the track located at a position corresponding to the landing zone for the load operation of the magnetic head (slider). The speed of the magnetic head (slider) withdrawn to the ramp is controlled at the unload operation. In the stage of initialization for controlling the speed of the load/unload operation, various parameters are recorded and updated to apply a voltage to power amplifier for compensating for the external forces caused by the friction mainly exerted between ramp and slider support members, with reference to the take-off track or the landing track specified in the landing zone.

4 Claims, 8 Drawing Sheets

LOAD/UNLOAD METHOD AND A MAGNETIC DISK DRIVE USING THE METHOD

BACKGROUND OF THE INVENTION

The present invention relates to a load/unload mechanism for a magnetic head, or in particular to the operation of controlling the load/unload mechanism smoothly by acquiring information from magnetic disk media.

A magnetic disk drive is a peripheral device in which a magnetic head writes (records) or reads (reproduces) information into or from at least a rotating magnetic disk medium for exchanging the information with a host system. In the case where the information is not exchanged, a slider having the magnetic head mounted thereon is undesirably kept on the magnetic disk media at the risk of the slider and the magnetic disk media coming into collision with each other under an external shock that may deteriorate shock resistance performance. On the other hand, the method of keeping the slider in a predetermined area of the magnetic disk media when the media stop rotating (contact start-stop (CSS)) is also undesirable as an adhesion would develop between the slider having the magnetic head mounted thereon and a specific magnetic disk medium.

In view of this, the magnetic disk drive has recently come to employ a load/unload technique for withdrawing the slider (magnetic head) outside of the magnetic disk media. In the load operation, the magnetic head is moved onto the magnetic disk media from the position where it is withdrawn and held, while in the unload operation, the magnetic head is moved to the position outside the magnetic disk media where it is withdrawn and held.

A technique for controlling the movement of the magnetic head by detecting the loading position of the magnetic head from the data recorded on the magnetic disk media is disclosed in JP-A-11-96708. This technique is such that in the loading process, the moving speed of the magnetic head is suppressed or the magnetic head is stopped thereby to prevent the collision between the magnetic head and the magnetic recording media.

In the unload operation for withdrawing the magnetic head from the surface of the media, on the other hand, an actuator having the slider mounted and supported thereon slows down or temporarily stops due to external forces extremely increased when a part of the slider support members including the suspension for supporting the slider rides over the ramp. In order to prevent this inconvenience caused by the movement of the actuator, the speed at which the slider support members run into the ramp at the time of unloading is set to a value considerably larger than the theoretical target speed. In this way, the movement of the slider for the load/unload operation has conventionally been controlled only roughly. As a result, the inconveniences such as the collision between the slider and the magnetic disk media have often occurred.

FIG. 4 can be used also to explain the prior art.

A part of the support members for the slider that has been in the seek operation over the magnetic disk medium 602 is combined with the ramp, so that the slider is unloaded under the guidance of the ramp. In the process, a part of the suspension constituting the support members runs into the ramp 608, and therefore the external forces 316 increase so sharply that the slider extremely slows down or temporarily stops on the ramp 608.

In order to prevent this phenomenon, according to the prior art, the design speed at which the slider runs into the ramp 608 is set to a value higher than the target speed 503 (324) on the ramp 608. Thus, the detected speed is high like the target speed 322 on the ramp slant surface 305a. As the result of the subsequent extreme change of the external forces 316, the detected speed 504 is decreased below the target speed 503 (detection speed 323), and is seen to take some time (325) before coming to coincide with the target speed 503.

Further, at the gradient change points 307a, 307b, 307c where the gradient of the ramp 608 changes, a speed error occurs between the detected speed 504 and the target speed 503 due to the change of the external forces caused by the gradient change, so that the detected speed is seen to take some time length 326a to 326c before coming to coincide with the target speed 503.

In unloading the magnetic head (slider), a part of the support members including the suspension for supporting the slider is combined with the ramp providing the withdrawal/holding means, and the magnetic head is withdrawn following the action of the particular part of the slider support members riding over the ramp. The reverse is the case for the load operation, in which the slider lands on the magnetic disk medium following the action of a part of the support members sliding down the ramp from the holding position thereof.

Generally, the component parts of the load/unload mechanism including the ramp and the slider having the magnetic head mounted thereon have geometric and mounting tolerances, so that the external forces acting between the ramp and the slider support members vary from one magnetic disk drive to another. In the case where the slider is moved to the ramp with a simple constant value, therefore, the slider would slow down or temporarily stop thereby making it difficult to withdraw it over the ramp at a steady rate.

In the prior art, the slider movement is controlled only roughly in the load/unload operation, thereby leading to such inconveniences as the collision between the slider and the magnetic disk media, the friction between or the wear of the ramp member and the slider support members, the generation of dust, etc.

Also, after the slider support members run into the ramp, the slider separated from the magnetic disk media at an insufficiently high position of the ramp collides with the magnetic disk media under a separation shock.

Further, the accurate velocity control operation has not been performed in spite of the need thereof for withdrawing the slider at a steady rate in the unload operation. Thus, the magnetic head sometimes misses the servo information in an area on the magnetic disk media where no servo information is written, with the result that the slider support members having the magnetic head mounted thereon and the ramp often collide with each other at a speed higher than the target speed.

SUMMARY OF THE INVENTION

The present inventors have taken note of the fact that the magnetic disk drive controls the velocity by feedback through a VCM (voice coil motor) and a control circuit thereof, and has come to hit an idea that the unload operation, if started at a predetermined reference position outer on the magnetic disk media, can subsequently be accurately controlled. In other words, the position at which the slider is unloaded is detected from the information recorded on the magnetic disk media, whereby the subsequent unload operation is controlled accurately.

An object of the present invention is to provide a technique for carrying out the stable load/unload operation for a magnetic disk drive having a load/unload mechanism, in which an actuator for moving the slider having the magnetic head mounted thereon is prevented from slowing down, temporarily stopping or otherwise changing the speed during the load/unload operation.

Another object of the invention is to provide a technique for controlling the load/unload operation for the magnetic head, in which the speed at which the slider support members including the suspension run into the ramp is set to a necessary and sufficient level lower than in the prior art thereby to reduce the wear caused by the friction between the ramp and the slider support members such as a suspension tab while at the same time suppressing the generation of dust for an improved reliability.

Still another object of the invention is to provide a technique for controlling the load/unload operation for the magnetic disk drive and the magnetic head, in which the speed of the slider unloaded and moved following the ramp is constantly maintained at a steady level thereby making it possible to avoid the collision between the slider separated from the magnetic disk media and the magnetic disk media under the shock of separation.

Yet another object of the invention is to provide a technique for controlling the load/unload operation for the magnetic disk drive and the magnetic head, in which the servo information and other control signals are written in the outer periphery of the magnetic disk media so that the position at which the slider lands on or takes off from the magnetic disk media in the load/unload operation can be recognized accurately by the magnetic disk drive based on the signal from the magnetic head, thereby making it possible to compensate for the values of the voltage or the current supplied to the power amplifier for driving the VCM, measurements and records of other parameters and the recorded values corresponding to the external forces including the friction exerted between the ramp and the slider support members and the suction exerted between the slider and the magnetic disk media.

(1) The servo information and the signal (load/unload reference signal) for performing the operation of positioning the magnetic head are formed up to an outside area beyond the management area and the user area of the magnetic disk media. These signals are written in the magnetic disk media using the servo track writer (STW) in the process before assembling the magnetic disk media on the spindle of the magnetic disk drive.

(2) The magnetic disk drive includes means for reading the load/unload reference signal, so that the back electromotive voltage of the voice coil motor (VCM) is detected and the load/unload operation is performed by the feedback velocity control.

(3) In the load/unload operation, the movement of the actuator is affected by the external forces including the suction exerted between the slider having the magnetic head mounted thereon and the magnetic disk media and the friction working between the slider support members and the ramp. The magnetic disk drive includes means for measuring and recording these external forces at predetermined sampling time intervals as a first step and carrying out the first step, and means for adding an operation amount corresponding to the external forces measured and recorded by the first step, and the means for carrying out the first step, to a power amplifier, an electronic circuit, a microprocessor or other control circuits for controlling the movement of the actuator as a second step and carrying the second step.

(4) A program for carrying out the first step and the second step through a microprocessor or the like computer is mounted on the magnetic disk drive.

DETAILED DESCRIPTION OF THE EMBODIMENTS

Embodiments of the present invention will be described below with reference to the drawings.

<Process for Fabricating Magnetic Disk Drive>

Figure 8:
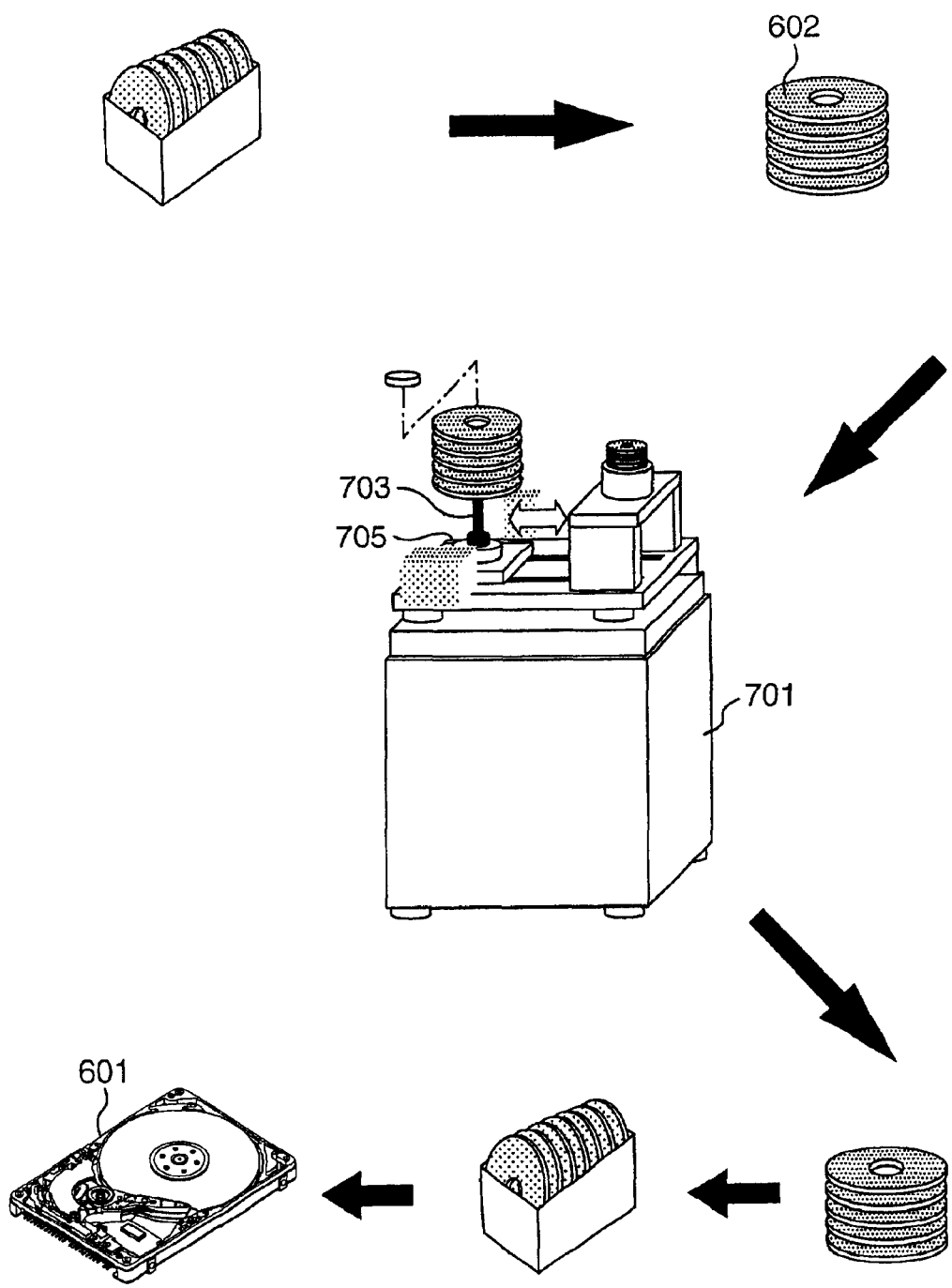
FIG. 8 is a diagram showing an example of the device for writing the servo information on the magnetic disk media before mounting the magnetic disk media on the spindle motor of the magnetic disk drive.

The process for fabricating a magnetic disk drive according to this invention is schematically shown in FIG. 8.

The servo information are written in magnetic disk media 602 by a servo track writer unit 701 before being built in the spindle motor of the magnetic disk drive. The servo track writer unit 701 stacks a plurality of magnetic disk media through spacers on a core 703 mounted on the spindle portion 705 and can write the servo information collectively on these magnetic disk media in the block.

In the method of writing the servo information using the magnetic head of the magnetic disk drive after the magnetic disk media are built in the magnetic disk drive, assume that the magnetic disk drive includes a load/unload mechanism. A part of the load/unload mechanism including a ramp 608 (FIG. 7), for example, interferes with the slider or other support members having the magnetic head mounted thereon, thereby making it difficult to write the servo information over an area extending up to the outside of the magnetic disk media. The use of the servo track writer unit 701, however, makes it possible to write the servo information over an area extending to the outer periphery of the magnetic disk media. As a result, the additional amount of the information written in the outer periphery of the media can be increased. The ramp is defined as a holding member for holding the slider by the outer peripheral portion or the outside portion of the magnetic disk media.

Figure 7:
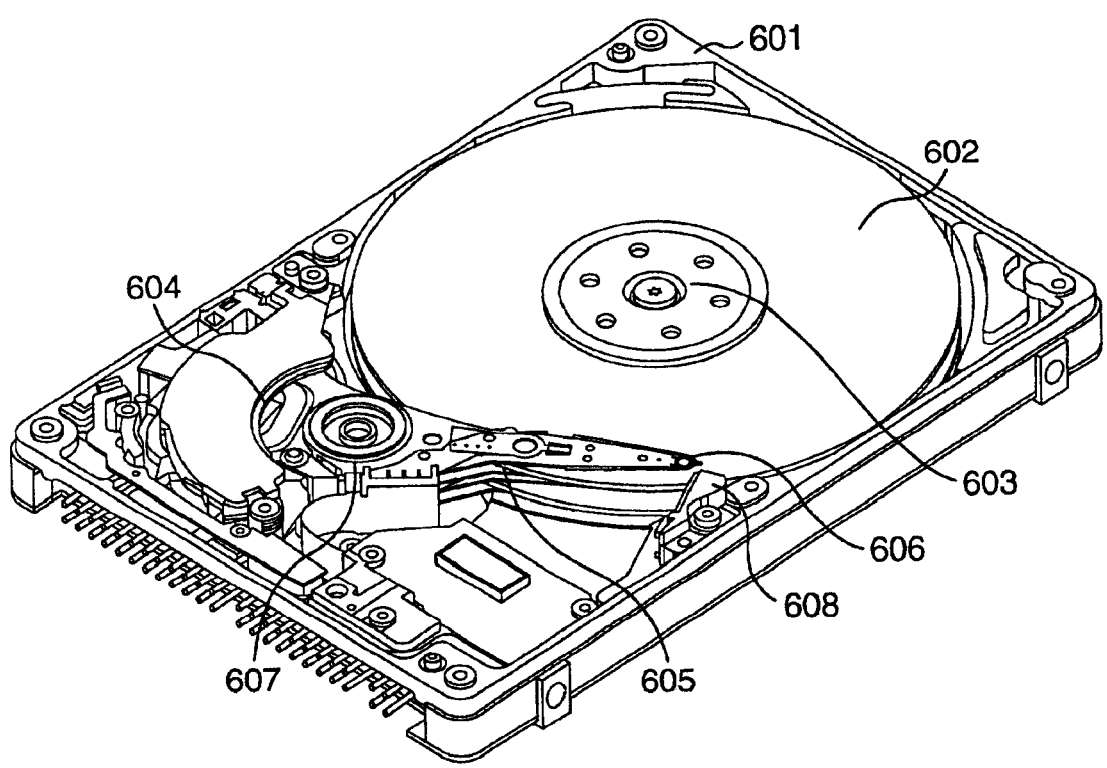
FIG. 7 is a diagram showing an example of the internal configuration of the magnetic disk drive having the load/unload mechanism.

FIG. 7 shows an internal configuration of a magnetic disk drive having the load/unload mechanism.

A spindle motor 603 is rotatably incorporated in the magnetic disk drive 601, and the slider having the magnetic head 606 mounted thereon is supported swingably on a carriage 605 so that the magnetic head 606 can record and reproduce the information into and from the magnetic disk media 602 supported on the spindle motor 603.

The carriage 605 includes a magnetic head 606 at one end thereof and a voice coil at the other end thereof. The voice coil makes up a voice coil motor (VCM) 604 or an actuator 607 as a whole which, upon energization thereof, swings the carriage by exerting Lorentz's force between the magnet and the magnetic field. The magnetic head 606, when not acting on the magnetic disk media 602, is in a withdrawn position outside the magnetic disk media 602 following the motion of the support members of the magnetic head riding over the ramp 608.

<Load/unload Mechanism and Control Means>

The magnetic disk drive 601 (FIGS. 7 and 8) according to an embodiment of the invention employs a load/unload mechanism. The load/unload mechanism is defined as a mechanism capable of withdrawing (unloading) the magnetic head outside of but not over the magnetic disk media when the magnetic head is not recording or reproducing the information on the one hand, and capable of positioning (loading) the magnetic head on the magnetic disk media as required on the other.

Normally, a part of the suspension constituting a member for supporting the slider with the magnetic head mounted thereon collaborates with the ramp in such a manner that a part of the suspension can move by sliding over the ramp.

Depending on the relative positions of the ramp and the slider supporting member, the slider is still attracted to the magnetic disk media even after a part of the slider support members begins to climb up the ramp, and once a part of the support members has climbed up to a predetermined portion of the ramp, the slider is released from the magnetic disk media. This separation enables the slider to vibrate in the neighborhood of the magnetic disk media and the ramp while being supported by the slider supports member.

In other words, the time point when a part of the slider support members begins to climb up the ramp and the time point when the slider is released from the magnetic disk media in the unload operation are different from each other. In similar fashion, the slider has landed on the magnetic disk media before a part of the slider support members has completely slid down the ramp in the load operation.

This is indicative of the fact that as long as a normal track is formed in the landing zone 304, for example, the accurate position on the track or the media can be recognized by the magnetic head to assure accurate take off and accurate landing. Also, in the unload operation, a part of the slider support members begins to climb up the ramp before the magnetic head takes off. Therefore, this position may be detected from the back electromotive voltage of the VCM and stored as the position of the take-off track. In the load operation, on the other hand, a part of the slider support members slides down the ramp after the magnetic head has landed. Therefore, this position can be detected from the back electromotive voltage of the VCM and stored as the position of the landing track.

Figure 6:
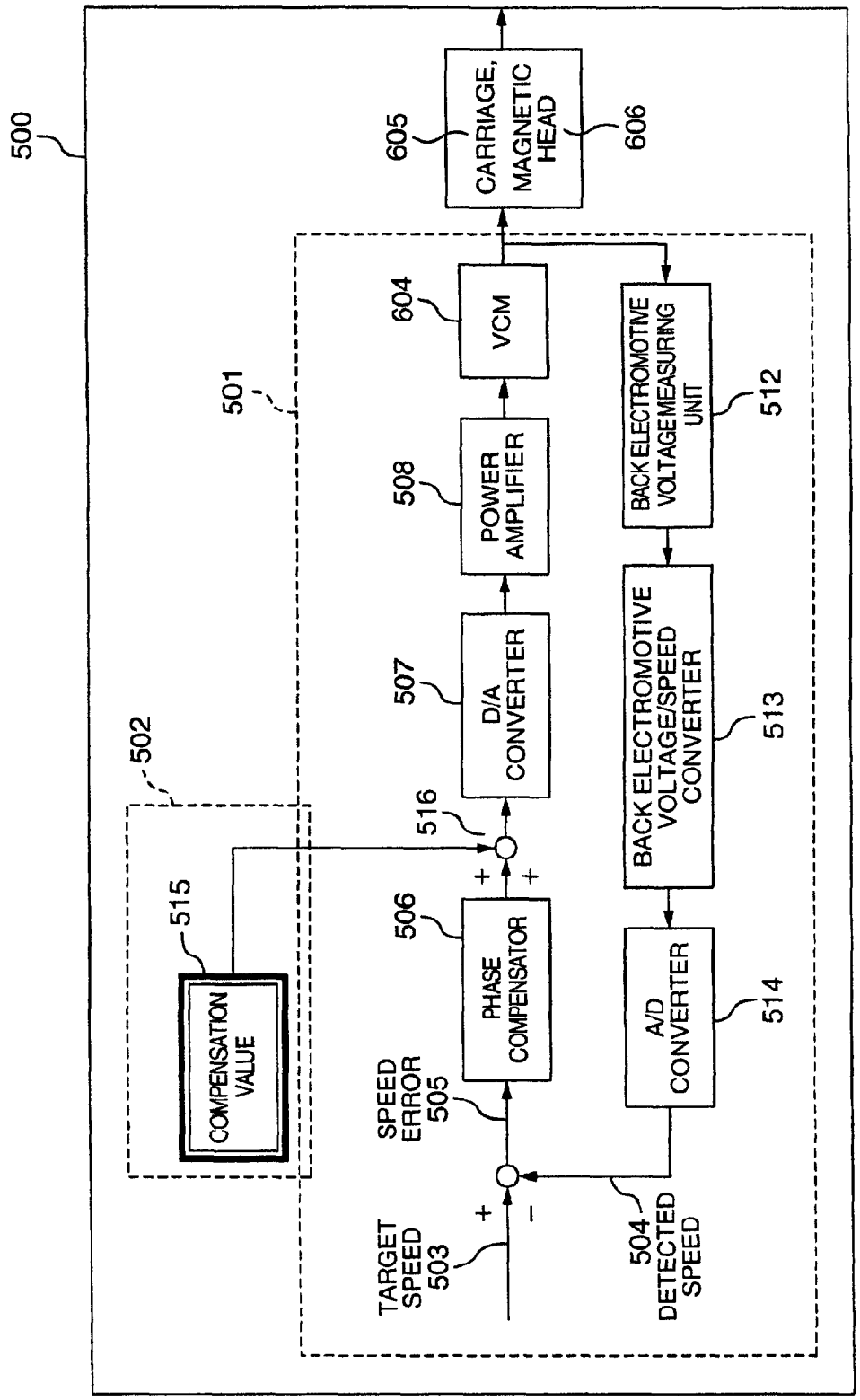
FIG. 6 is a block diagram showing an example of the load/unload control circuit of the magnetic disk drive according to the invention.

In the operation for withdrawing the magnetic head (slider) accurately, an unload speed control system 500 (FIG. 6) is used. The control system 500 is roughly divided into a feedback control system 501 and a feedforward control system 502.

The feedback control system 501 includes:

a phase compensator 506 compensating for the phase lead and delay based on the speed error 505 between the target speed 503 of the actuator 607 (FIG. 7) and the detected speed 504;

a D/A converter 507 for converting the digital output of the circuit in the preceding stage such as the phase compensator 506 into an analog value;

a power amplifier 508 for amplifying the output of the D/A converter 507;

a VCM (voice coil motor) 604 controlled by the current supplied from the power amplifier 508;

a carriage 605 including the magnetic head 606 for positioning on a target track by the propulsive force obtained by the VCM 604;

a back electromotive voltage measuring unit 512 for measuring the back electromotive voltage of the VCM 604;

a back electromotive voltage/speed converter 513 for converting the back electromotive voltage obtained from the back electromotive voltage measuring unit 512 into the actuator speed; and an A/D converter 514 for converting the analog voltage produced from the back electromotive voltage/speed converter 513 into a digital value.

The feedforward control system 502, on the other hand, adds the compensation value 515 corresponding to the external forces 316 (FIGS. 4 and 5) acting on the actuator 607 in the unload operation to the output of the phase compensator 506 of the feedback control system 501 and inputs it to the D/A converter 507.

These unload control operations are realized with a microcomputer and other general-purpose electronic parts.

<Details of Load/unload Operation>

With the magnetic disk media 602 according to an embodiment of the invention, the servo information is written in a range called the landing zone 304 (FIGS. 4 and 5) where the magnetic head 606 first lands on the media 602 from the ramp 608 (FIG. 7) in the load operation of the magnetic head.

By reading this servo information through the magnetic head 606 in the unload operation, it is possible to determine the track number (hereinafter referred to as the take-off track) on the magnetic disk media for the magnetic head to take off from the magnetic disk media 602 under the guidance of the ramp 608.

Specifically, the accurate position on the magnetic disk media where the magnetic head takes off can be determined. Due to the mounting tolerance allowed for the component parts of the mechanism, the position at which the magnetic head lands or takes off in the load/unload operation is varied from one magnetic disk drive to another. To determine the take-off position and the landing position accurately, however, is tantamount to obviating the inconveniences due to the tolerance by causing the control system of the magnetic disk drive to function appropriately.

Figure 4:
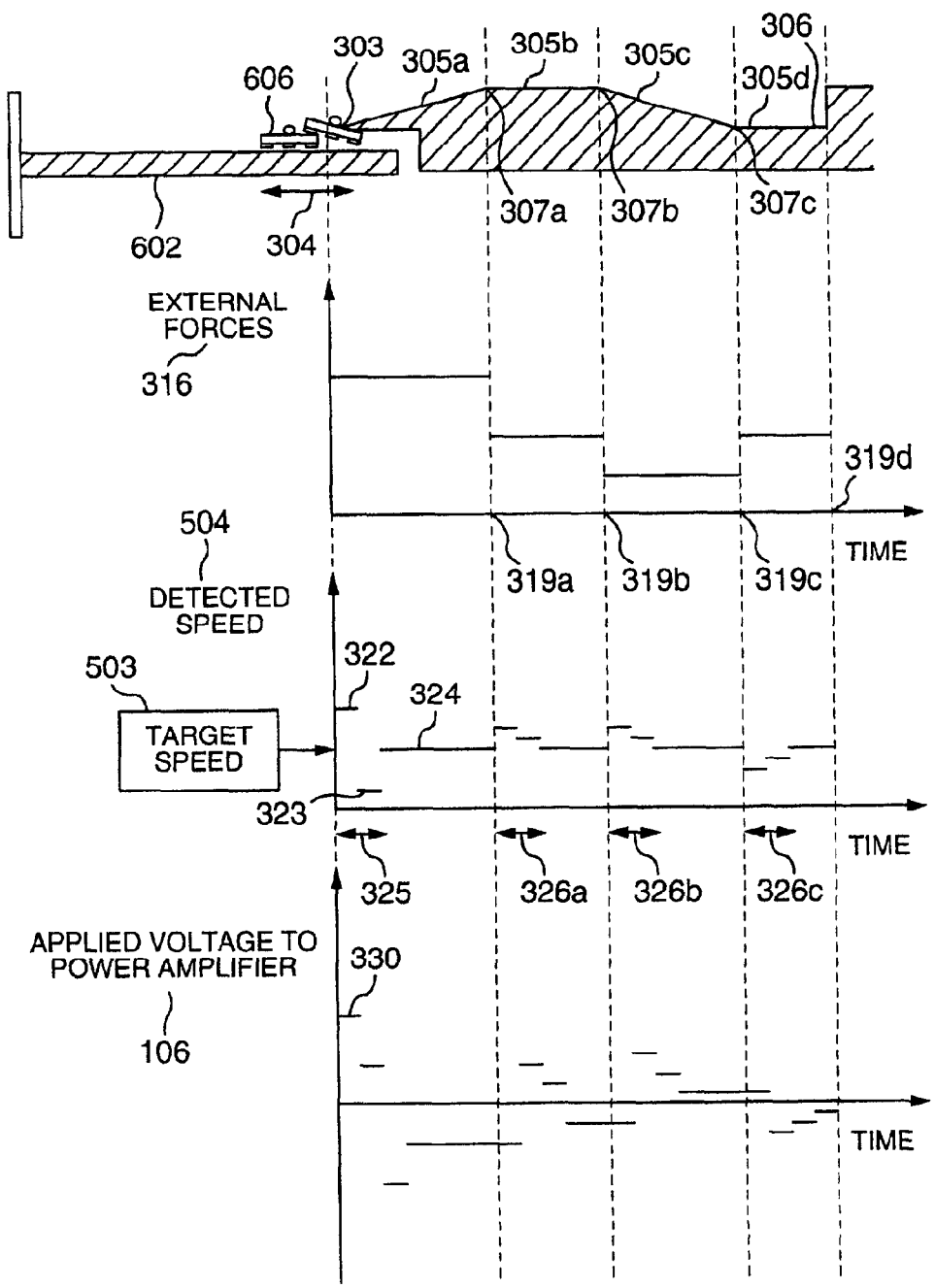
FIG. 4 is a diagram for explaining an example of setting the initial values, in which the sectional view in the neighborhood of the ramp of the magnetic disk drive is divided into a plurality of areas, while showing an example of the external forces exerted between the slider and the ramp in the unload operation, the actuator speed detected from the back electromotive voltage of the VCM (detected speed) and the applied voltage to the power amplifier.

The operation of the magnetic disk drive 601 for setting the initial value will be explained with reference to FIG. 4. In FIG. 4, the external forces 316 acting on the actuator 607 (FIG. 7), the back electromotive voltage of the voice coil motor 604 (FIG. 7), the detected speed 504 of the actuator 607 obtained from the back electromotive voltage/speed converter 513 (FIG. 6) and the voltage 106 applied to the power amplifier are indicated for each part of the ramp extending from the slant surface 305a to the second flat portion 305 in the unload operation. Depending on the type of the actuator, the input or the output of the power amplifier may be a change in current.

A series of unload operation are performed until the end of first measurement of the initial value when the measurements are stored in the magnetic disk drive 601. Specifically, the ramp 608 is divided into predetermined areas, and in accordance with the external forces acting on each of the areas, the target speed, the voltage applied to the power amplifier and other initial values are measured and stored.

Now, consider the case in which the magnetic head is unloaded from the take-off track.

In the step of setting the initial values for the unload operation, the target speed is considerably dispersed in the starting portion of each area (the left side of each area in FIG. 4) and the applied voltage to the power amplifier is changed to a correspondingly large extent. In other words, the external forces are large and the target speed fluctuates when a part of the suspension supporting the magnetic head (slider) slides up the ramp slant surface 305a, while the detected speed is stabilized once the same part begins to climb up the slope. The applied voltage 106 to the power amplifier is considerably large as indicated by 330 in the process of unloading from the landing zone 304.

Then, on the flat ramp portion 305b where different external forces are exerted, the target speed is stabilized after fluctuating at the start of the ramp flat portion 305b. Numerals 326a, 326b, 326c in FIG. 4 designate the standby time before stabilization of the target speed, and upon the lapse of this time, the target speed is stabilized. By repeating this operation, the magnetic head 606, together with a part of the suspension, reaches the ramp home position 306 corresponding to a second ramp flat portion 305d.

It is seen that at the end portion of each area, both the target speed and the applied voltage to the power amplifier are stabilized. These stabilized values are stored as initial values for the unload operation in the magnetic disk drive 601. The end portion of each area is defined as the portion where the movement of the magnetic head 606 ends in the direction thereof.

Once the initial values for the load operation performed by moving the suspension from the second ramp flat portion 305d, the second ramp slant surface 305c, the ramp flat portion 305b and the ramp slant surface 305a in that order are set independently, a more accurate load operation can be performed than using the initial values for the unload operation as the initial values for the load operation. Further, by setting the initial values for the load operation and controlling the load operation using the particular initial values, the magnetic disk drive 601 can detect the accurate landing track for the magnetic head 606.

<Step of Setting Initial Values>

Figure 2:
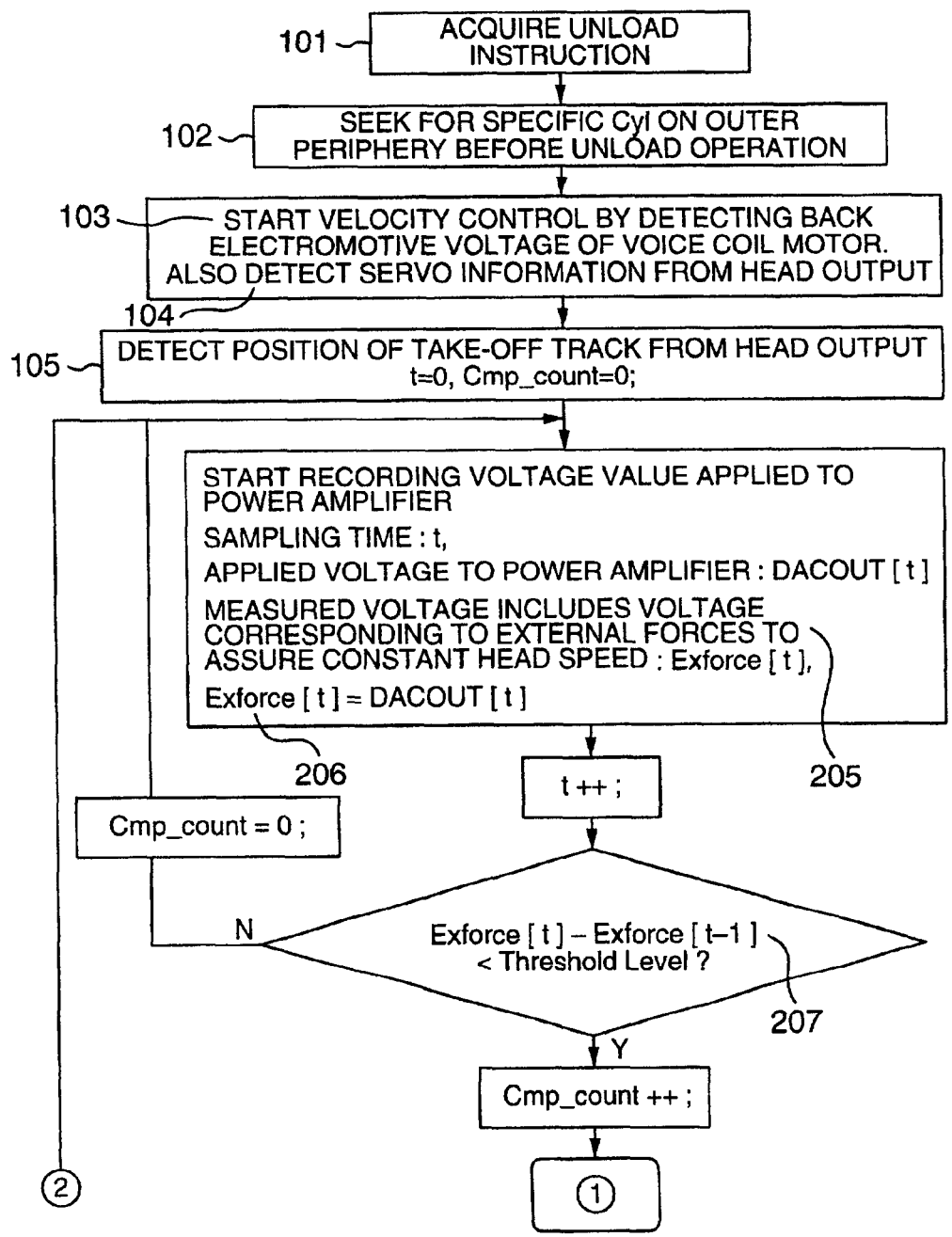
FIG. 2 is a flowchart showing an example of setting the initial values for the unload operation of the magnetic disk drive according to the invention.

Now, the process for setting the initial values will be explained with reference to FIGS. 2 and 3.

The magnetic disk drive 601, upon acquisition of an unload instruction (101), performs the seek operation aimed at a specified track (take-off track) located on the outer periphery of the magnetic disk media (102). The magnetic disk drive 601 thus starts to detect the back electromotive voltage of the voice coil motor thereby to validate the functions of the speed control system (103), while at the same time starting to acquire the servo information on the magnetic disk media from the output of the magnetic head 606 (104).

Then, with the change of the back electromotive voltage as a motive, the position of the take-off track is detected from the output of the magnetic head, and the time is initialized in the step of setting the initial values for the unload operation thereby to initialize predetermined parameter values (105). After that, the unload operation is performed in which the magnetic head, together with the suspension providing the slider support members, leaves the media 602 under the guidance of the ramp.

The position of the take-off track may be on the landing track read in advance by the magnetic head at the time of the load operation. The take-off track and the landing track both exist in the landing zone 304.

The relation between DACOUT [t] which is the applied voltage 106 (FIG. 4) to the power amplifier at time point t and the measured voltage Exforce [t] 205 including the voltage corresponding to the external forces 316 at the same time point is given as $$\text{Exforce [t]=DACOUT [t]} \tag{206}$$

The magnetic disk drive 601 records this value as the applied voltage 106 to the power amplifier.

Character t designates an appropriate sampling interval, or a time interval at which the parameters and data are fetched by the magnetic disk drive 601. This sampling interval t doubles as an expression of time. According to this embodiment, in FIGS. 4 and 5, for example, each time point is determined by such an expression as after the lapse of time T1 (319a), after the lapse of time T2 (319b), after the lapse of time T3 (319c), after the lapse of time T4 (319d) or the like counted from the take-off track, the landing track or other specified track.

According to the shape and the slide friction coefficient of the surface of the ramp 608, the time schedule for the whole process of setting initial values is divided into the ramp slant surface 305a to the second ramp flat portion 305d and managed by the magnetic disk drive 601 with a table as to the time point to which each area corresponds. Thus, the applied voltage values to the power amplifier are recorded.

Assume that the difference between the applied voltage 106 to the power amplifier (FIG. 4) and the applied voltage 106 at the preceding sampling time t−1 is not more than a given threshold level, i.e. assume that the answer is YES in the comparison logic 207 given as $$\text{Exforce [t]−Exforce [t−1]<Threshold level} \tag{207}$$

Figure 3:
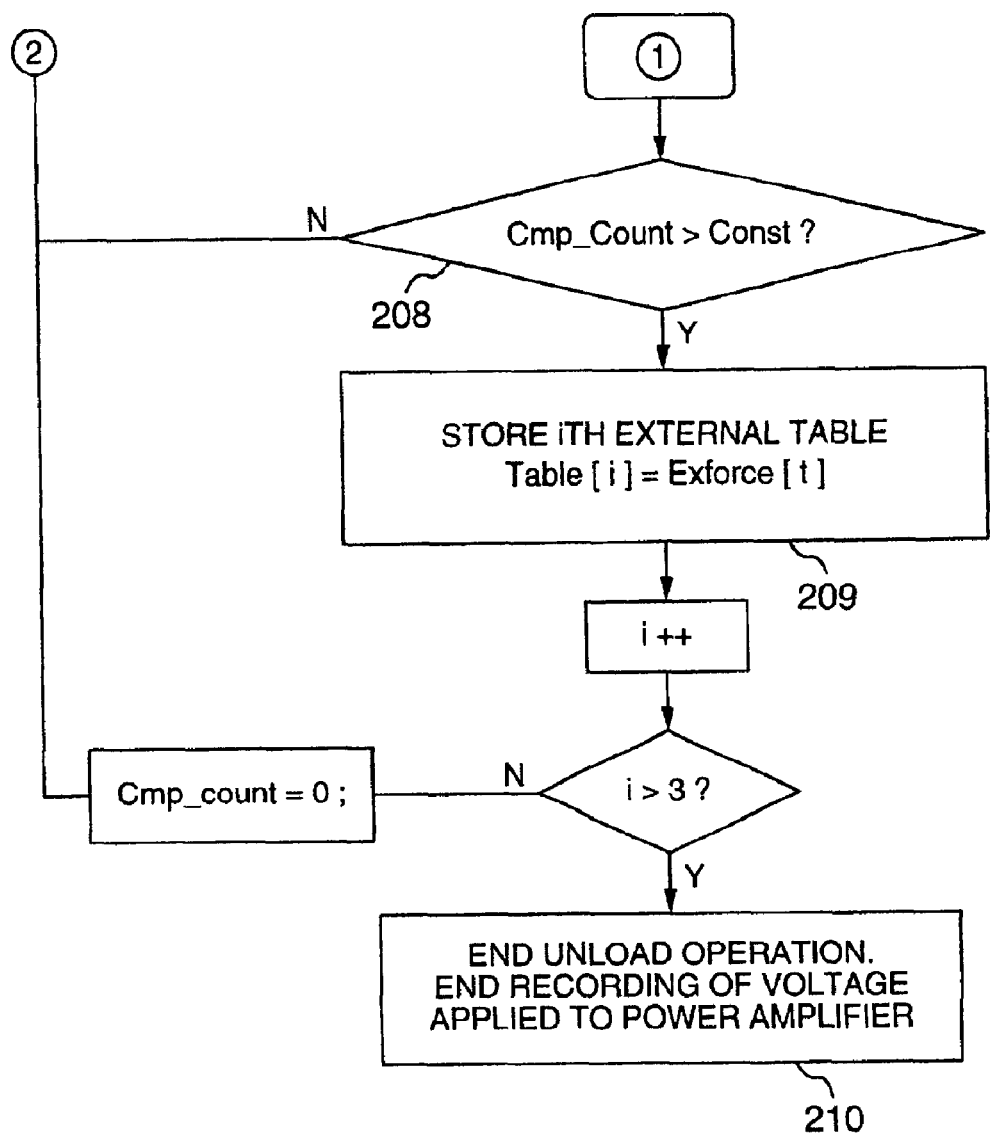
FIG. 3 is a continuation of the flowchart shown in FIG. 2.

The process proceeds to the steps shown in FIG. 3. In the case where this condition continues for several sampling times, i.e. the answer is YES in the comparison logic 208 given as $$\text{Cmp\_Count>Const} \tag{208}$$

it is determined that the detected speed 504 is coincident with the target speed 503, and the applied voltage 106 to the power amplifier 508 is stored as Table [i] in the compensation table arranged in the flash ROM constituting a nonvolatile, rewritable storage element (209). In other words, the logic operation given as $$\text{Table [i]=Exforce [t]} \tag{209}$$

is performed.

According to this embodiment, the aforementioned operation is continuously performed a total of four times (i=0 to 3) when the gradient of the ramp 608 changes until the ramp home position 306, and at the end of the unload control operation, the recording in the compensation table is terminated (210). The initial values for the unload operation are thus completely set.

The initial values for the load operation can be set in similar fashion.

<Load/unload Operation using Set Values>

Figure 1:
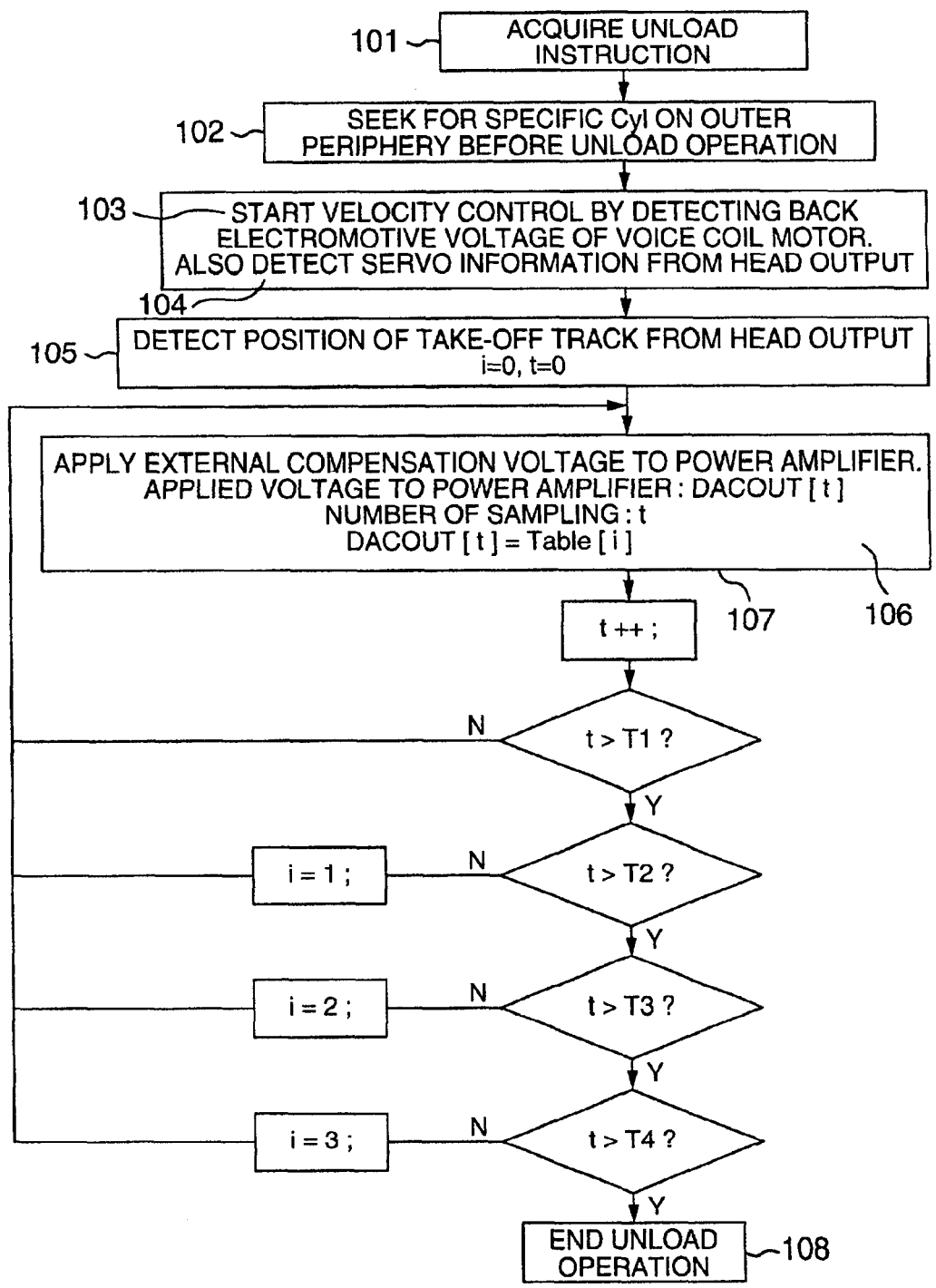
FIG. 1 is a flowchart showing an example of the method of controlling a magnetic disk drive according to the invention.
Figure 5:
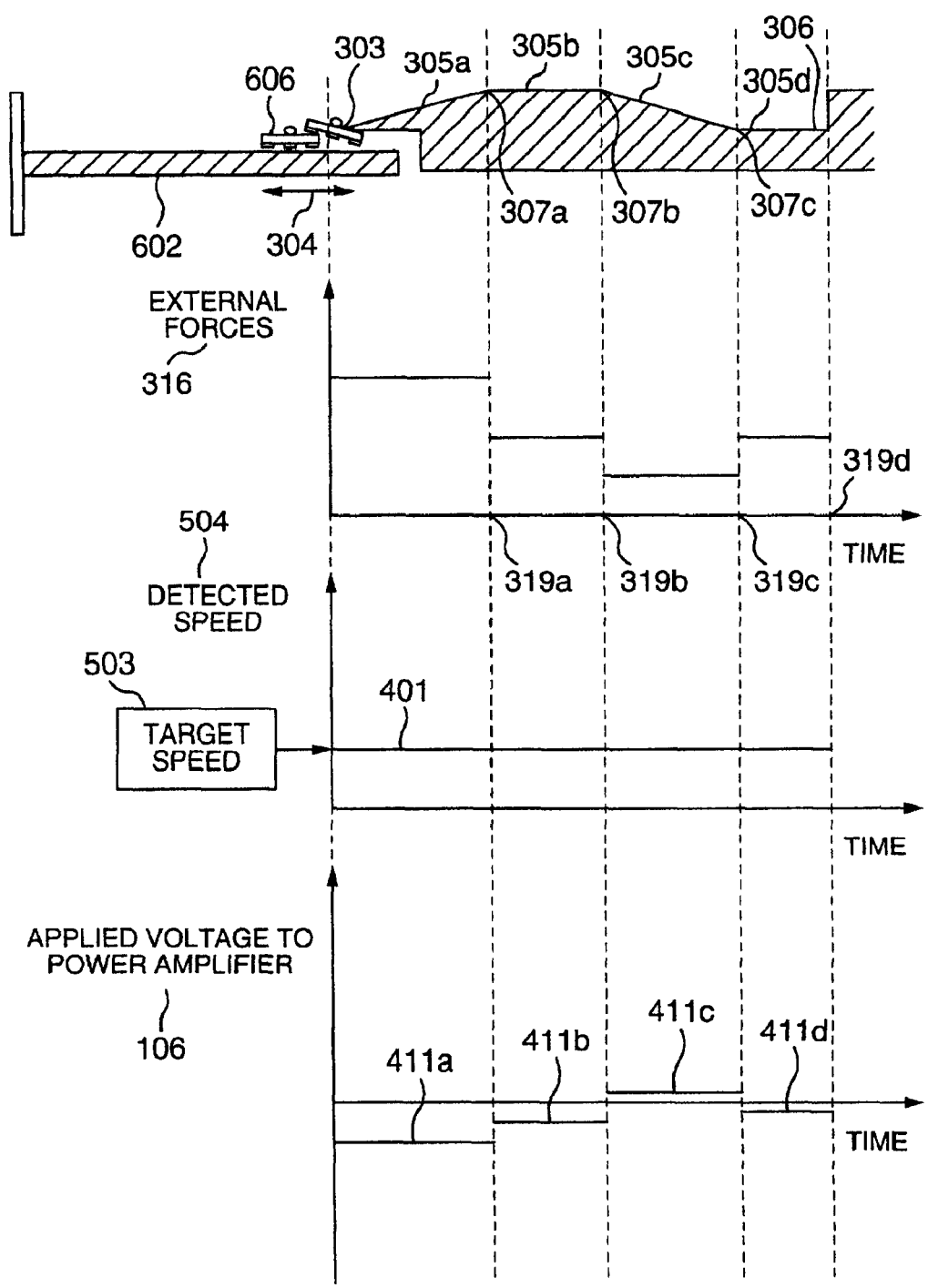
FIG. 5 is a diagram corresponding to FIG. 4 for explaining the operation after setting the initial values.

The unload operation after setting the initial values will be explained with reference to FIGS. 1 and 5.

As soon as the magnetic disk drive 601 acquires an unload instruction from the host system (101 in FIG. 1), the magnetic head is caused to perform the seek operation on the take-off track or the landing track (102). Upon detection of the back electromotive voltage of the voice coil motor, the velocity control operation is started (103) while at the same time detecting the servo information from the magnetic head (104). The position of the take-off track is detected from the output of the magnetic head and the predetermined parameters are initialized (105).

The initial values (the values stored in the compensation table) set in the flash ROM is accessed. The count operation is started with the take-off track as a reference, and the voltage of the initial value is applied to the power amplifier 508 (FIG. 6) as a voltage to compensate for the external forces. In other words, the following relation is held.

$$DACOUT [t]=Table [i] \qquad (107)$$

As a result, the magnetic head can be withdrawn from the end portion 303, through the positions 305a, 305b, 305c to the position 305d (home position) of the magnetic disk medium on the ramp 608 at a predetermined target speed 503. The target speed 503 may assume different values at positions 305a to 305d. The required time during which the voltage 106 is applied to the power amplifier is calculated as follows.

Specifically, a general-purpose microcomputer or other electronic circuits are used for the calculation taking into account the positions of the take-off track and the landing track, the sampling time point or time length t, the gradient, distance, friction coefficient and other surface conditions for each area of the ramp 608 and the target speed 503 for the unload operation on the ramp 608.

The optimum contents of the compensation table 515 for withdrawing the magnetic head at a predetermined speed on the ramp 608 may be changed by the temperature change in the ambience around the magnetic disk drive 601 or the secular variation of the internal mechanism and circuits. Each time the unload operation or the magnetic disk drive 601 is started or at predetermined time intervals, therefore, the contents of the compensation table 515 in the flash ROM may be recorded or updated.

Also, in the fabrication process of the magnetic disk drive 601, the unload operation may be repeated a plurality of times so that the applied voltage 106 to the power amplifier is measured to set a plurality of initial values and an average value thereof may be stored in the compensation table 515 in the flash ROM.

According to the embodiments of the invention, the speed error 505 (FIG. 6) of the actuator 607 caused by the change in the external forces acting on the actuator in the unload control operation is suppressed, and while maintaining a predetermined target speed 503 (FIG. 5), the actuator 607 can be moved smoothly from the end portion 303 of the magnetic disk medium on the ramp 608 to the home position 306.

In a magnetic disk drive having a load/unload mechanism, the magnetic head is unloaded in such a manner that while the actuator (including the slider, the suspension and the magnetic head) is prevented from slowing down extremely or stopping temporarily on the ramp, an always constant speed is maintained thereby to assure a smooth, stable load/unload operation.

The residual vibration generated in the slider running into the ramp can be suppressed, and therefore the collision between the slider and the magnetic disk media can be avoided at an insufficiently high ramp position.

In view of the fact that the speed at which the slider support members run into the ramp can be suppressed as compared with the corresponding speed in the prior art, the wear caused by the friction between the ramp and the head tab (part of the slider support members) can be reduced for an improved reliability of the operation.

The take-off track or the landing track for the magnetic head (slider) can be accurately detected, and therefore the magnetic head is prevented from running into the ramp at higher than the target speed, thereby contributing to an improved reliability.

It will be further understood by those skilled in the art that the foregoing description has been made on embodiments of the invention and that various changes and modifications may be made in the invention without departing from the spirit of the invention and scope of the appended claims.

What is claimed is:

1. A control method for a magnetic disk drive including a magnetic disk medium, a slider mounting thereon a magnetic head facing said magnetic disk medium, support members for supporting said slider, an actuator for rotatably supporting said support members, an electronic circuit for controlling drive of said actuator and signal processing, and a holding member for holding said slider, the method comprising:

a setting step for setting a parameter for driving said actuator in each of plural stepwise movements of said slider following a shape of said holding member;

an unload step for starting a process for holding said slider on said holding member while reading information from said magnetic disk medium through said magnetic head, before causing said slider to move from said magnetic disk medium onto said holding member; and a load step for causing said magnetic head to read the information from said magnetic disk medium while following said holding member, before causing said slider to land from said holding member onto said magnetic disk medium.

2. The control method according to claim 1, wherein said process for holding said slider on said holding member is divided into two or more stepwise movements in advance, and at the end of movement of said slider in each of said two or more stepwise movements, the value of a voltage or a current for driving said actuator is stored.

3. The control method according to claim 1, wherein said process for holding said slider on said holding member is divided into two or more stepwise movements in advance, and the value of a voltage or a current for driving said actuator is constant in each or said two or more stepwise movements.

4. A magnetic disk drive, comprising:

a magnetic disk medium;

a slider mounting thereon a magnetic head facing said magnetic disk medium;

support members for supporting said slider;

an actuator for rotatably supporting said support members; and an electronic circuit for controlling drive of said actuator and signal processing, the electronic circuit having a function of setting a parameter for driving said actuator in each of two or more stepwise movements for moving said slider while following a shape of said holding member and said magnetic head reads information from said magnetic disk medium while moving on said holding member, and a function of performing a mechanical load/unload operation smoothly using said set parameter.

* * * * *